W. BROWN.
Fruit-Gatherer.
No. 61,709.
Patented Feb. 5, 1867.
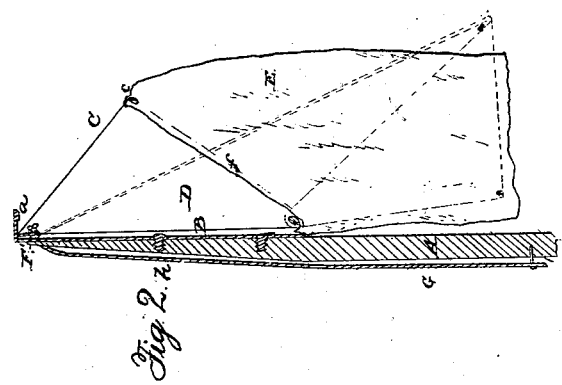
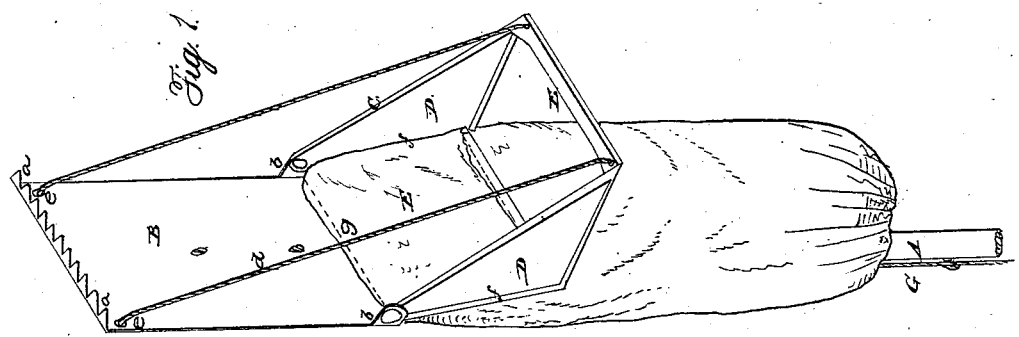

United States Patent Office.

WILLIAM BROWN, OF WORCESTER, MASSACHUSETTS.

*Letters Patent No. 61,709, dated February 5, 1867.*

IMPROVEMENT IN FRUIT PICKERS.

*The Schedule referred to in these Letters Patent and making part of the same.*

KNOW ALL MEN BY THESE PRESENTS:

That I, WILLIAM BROWN, of the city and county of Worcester, and Commonwealth of Massachusetts, have invented certain new and useful improvements in Fruit Pickers; and I do hereby declare that the following is a full, clear, and exact description of the same, reference being had to the accompanying drawings, forming a part of this specification, in which—

Figure 1 represents a perspective view of the picker with a portion of the handle and operating cord; and Figure 2 represents a vertical central section of the picker.

In the drawings, A represents the handle, which may be made of any desired length, and be in one piece, or it may be made in sections so that it can be lengthened and shortened at pleasure. To the top of the handle A—which for convenience is made in wedge form—is fastened the back metal part B of the picker, the top of which is bent forward and notched, or serrated, as shown at $a$ in the drawings. The lower end of the part B has two ears $b\ b$, one on each lower edge, and to which ears $b\ b$ is hinged the mouth-piece C, the sides D D of which are united at the top by a strong wire, $c$, to which the front of the fruit bag E is fastened. The sides D D are also united at the opposite edges by a flat metal piece, F, to the ends of which are connected the cords or ropes, $d\ d$, which pass through holes $e\ e$ provided with eyelets in the back piece B. The mouth-piece C is so arranged that when it is drawn up, as shown in dark lines, fig. 2, the piece F will pass under the notched or serrated bent part $a$ of the piece B. The fruit bag E is fastened to the edges of the sides D D as shown at $f\ f$, and also to the bottom of the back piece B, as shown at $g$. The cords $d\ d$, after passing through the back piece B, are fastened together, or are united to the main cord or rope G at $h$. When the cord or rope G is loosened, the mouth-piece C opens, as shown in dark lines, fig. 1, and red lines, fig. 2, so that the operator can have an unobstructed view of the fruit to be picked while arranging the picker.

The operation is as follows: The operator takes the handle A, and runs the part B just back of the apple, pear, plum, or bunch of grapes or cherries which it is desired to pick. After the part B has been properly arranged to bring the serrated part $a$ upon the stem of the fruit, cord or rope G is drawn down, thereby drawing up mouth-piece C, as shown in dark lines, fig. 2, whereby the stem of the fruit is clasped between the metal teeth $a$ and the part or jaw F. In ordinary cases, by the operation above described, the stem will be broken or the fruit separated from the stem; if not, however, a slight twist of the picker will accomplish the same. In either case, as soon as the cord G is loosened, the fruit falls into the bag E, which may be made of any desired size. The jaw or part F may be made in the form of a knife or cutter, or in any other shape if preferred. The same is also true of the serrated edge $a$. In practice, however, I do not consider it essential to even have the serrated edge $a$, since the grip of the jaw F against the back part of B will be sufficient to hold the stem while the operator pulls the latter from the limb or stalk. It will be observed that jaw F turns down so that the back B can be placed in proper position as respects the fruit without danger of jamming the latter.

Having described my improved fruit picker, what I claim as new and of my invention, and desire to secure by Letters Patent, is—

1. The combination of the hinged mouth-piece C with the back B, and bag E, substantially as set forth.
2. The combination, with the mouth-piece C, of the ropes or cords $d\ d$, and G, as and for the purposes set forth.

WM. BROWN.

Witnesses:
    THOS. H. DODGE,
    D. L. MILLER.